United States Patent
McClintock et al.

(10) Patent No.: US 9,658,652 B2
(45) Date of Patent: May 23, 2017

(54) CONVERTIBLE INFORMATION HANDLING SYSTEM INPUT DEVICE SURFACE AND SUPPORT

(71) Applicant: Dell Products L.P., Round Rock, TX (US)

(72) Inventors: David L. McClintock, Austin, TX (US); Jason T. Franz, Austin, TX (US); Justin C. Lyles, San Diego, CA (US); Charles D. Hood, III, Cedar Park, TX (US); Deeder M. Aurongzeb, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 357 days.

(21) Appl. No.: 14/159,887

(22) Filed: Jan. 21, 2014

(65) Prior Publication Data
US 2015/0205331 A1    Jul. 23, 2015

(51) Int. Cl.
*G06F 1/16* (2006.01)

(52) U.S. Cl.
CPC .......... *G06F 1/1662* (2013.01); *G06F 1/1618* (2013.01); *G06F 1/1677* (2013.01); *G06F 1/1681* (2013.01)

(58) Field of Classification Search
None
See application file for complete search history.

(56) References Cited

U.S. PATENT DOCUMENTS

| | | | | |
|---|---|---|---|---|
| 5,796,575 A * | 8/1998 | Podwalny | ............. | G06F 1/1626 361/679.27 |
| 5,987,704 A * | 11/1999 | Tang | ................... | G06F 1/1681 16/342 |
| 6,223,393 B1 * | 5/2001 | Knopf | .................. | G06F 1/1681 16/366 |
| 6,262,885 B1 * | 7/2001 | Emma | .................. | G06F 1/1618 361/679.05 |
| 6,341,061 B1 * | 1/2002 | Eisbach | ................ | G06F 1/1616 312/223.2 |
| 8,203,832 B2 * | 6/2012 | Szabolcsi | ............. | G06F 1/1616 248/917 |
| 8,265,705 B2 * | 9/2012 | Lee | ....................... | G06F 1/1616 345/169 |

(Continued)

OTHER PUBLICATIONS http://lifehacker.com/leave-your-keyboard-feet-folded-in-for-better-ergonomic-514381372, printed Jul. 22, 2015.

*Primary Examiner* — Courtney Smith
*Assistant Examiner* — Rashen E Morrison
(74) *Attorney, Agent, or Firm* — Terrile, Cannatti, Chambers & Holland, LLP; Robert W. Holland

(57) ABSTRACT

A convertible information handling system transitions to tablet and tablet stand configurations having a keyboard with a friction enhanced surface disposed against a support surface, the keyboard resisting movement of the information handling system relative to the support surface. For example, the keyboard has a rubberized plastic outer surface on non-moving keys to effectively increase the surface area of the keyboard in contact with the support surface. In one embodiment, the friction enhanced surface has its friction characteristics increased when proximate a support surface and decreased when distal a support surface.

3 Claims, 4 Drawing Sheets

(56) References Cited

U.S. PATENT DOCUMENTS

| | | | | |
|---|---|---|---|---|
| 8,390,255 B1* | 3/2013 | Fathollahi | ............ | H02J 7/0045 |
| | | | | 206/308.3 |
| 8,624,844 B2* | 1/2014 | Behar | ................. | G06F 1/162 |
| | | | | 345/168 |
| 8,724,302 B2* | 5/2014 | Whitt, III | ............ | G06F 1/1618 |
| | | | | 361/679.09 |
| 8,803,816 B2* | 8/2014 | Kilpatrick, II | ........ | G06F 1/1616 |
| | | | | 345/173 |
| 9,176,538 B2* | 11/2015 | Boulanger | ............ | G06F 1/1684 |
| 9,223,344 B2* | 12/2015 | Wang | ................. | G06F 1/1632 |
| 9,426,405 B2* | 8/2016 | Sathya | ................. | H04N 5/602 |
| 2003/0142469 A1* | 7/2003 | Ponx | ................. | G06F 1/1616 |
| | | | | 361/679.04 |
| 2009/0201254 A1* | 8/2009 | Rais | ................. | G06F 1/1613 |
| | | | | 345/168 |
| 2012/0106047 A1* | 5/2012 | Chu | ................. | G06F 1/166 |
| | | | | 361/679.01 |
| 2013/0154941 A1* | 6/2013 | Moser | ................. | G06F 1/1626 |
| | | | | 345/168 |
| 2013/0194741 A1* | 8/2013 | Uchiyama | ............ | G06F 1/1681 |
| | | | | 361/679.26 |
| 2013/0228435 A1* | 9/2013 | Whitt, III | ............ | H01H 13/704 |
| | | | | 200/5 A |
| 2013/0346636 A1* | 12/2013 | Bathiche | ............ | G06F 13/102 |
| | | | | 710/8 |
| 2014/0160654 A1* | 6/2014 | Yoo | ................. | G06F 1/1637 |
| | | | | 361/679.12 |
| 2014/0340840 A1* | 11/2014 | Han | ................. | G06F 1/1632 |
| | | | | 361/679.43 |
| 2014/0376145 A1* | 12/2014 | Zhang | ................. | G06F 1/1679 |
| | | | | 361/143 |
| 2015/0193009 A1* | 7/2015 | Sharma | ................. | G06F 1/1616 |
| | | | | 345/169 |

* cited by examiner

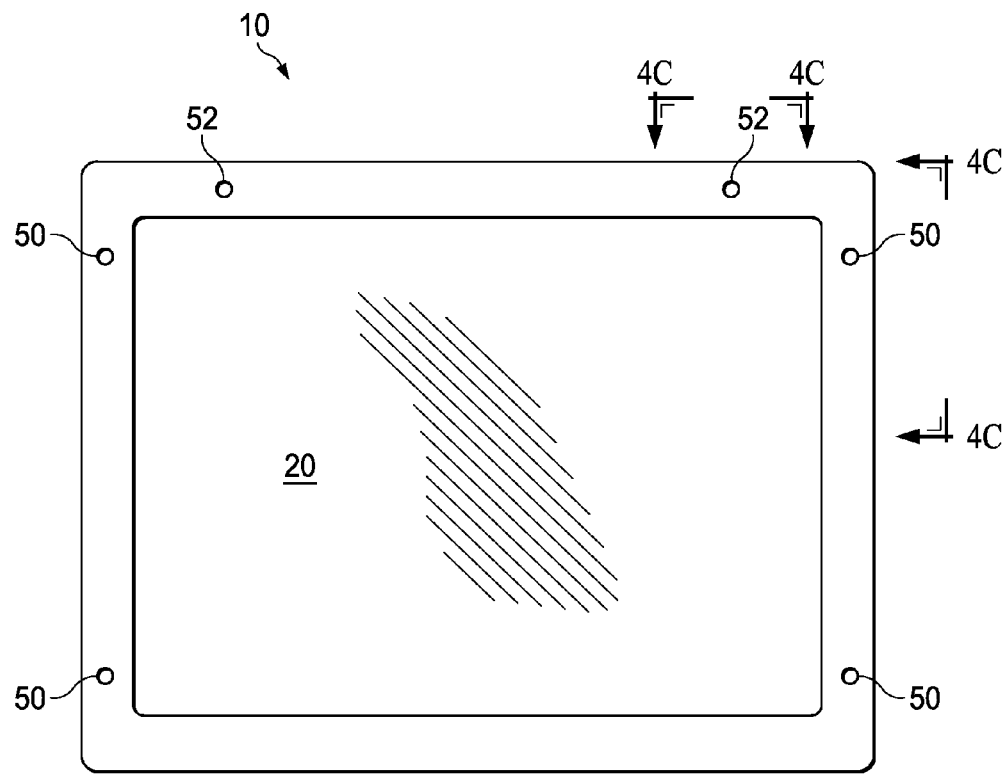
FIG. 4A
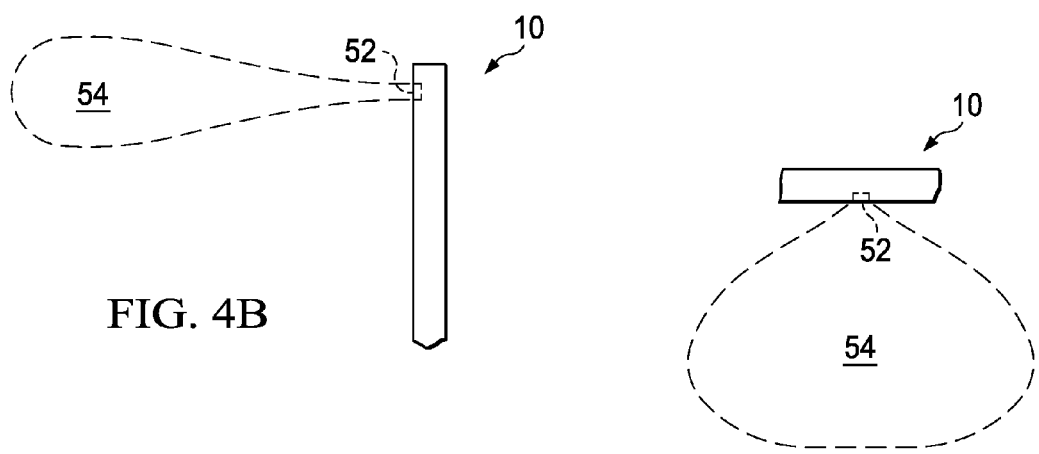
FIG. 4B
FIG. 4C

CONVERTIBLE INFORMATION HANDLING SYSTEM INPUT DEVICE SURFACE AND SUPPORT

BACKGROUND OF THE INVENTION

Field of the Invention

The present invention relates in general to the field of information handling systems having convertible housing, and more particularly to a convertible information handling system input device surface and support.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems are built in housings having a variety of configurations. A traditional clamshell configuration has a lid rotationally coupled to a main chassis portion so that the lid articulates between open and closed positions. In the open position, the lid rotates approximately 90 degrees to expose a display that presents visual information provided by processing components disposed in the main chassis portion. In the closed position, the lid rotates to bring the display against the main chassis portion to provide portability. Although conventional clamshell configurations provide ease of use and convenience, when the lid is free to rotate the display supported by the lid generally does not offer a firm enough platform for accepting touchscreen inputs. For this and other reasons, portable information handling systems that include a touchscreen display in an articulating lid generally provide rotation to a tablet-type of configuration in which the lid is supported to remain stationary during touch interfaces. Such systems are generally known as convertible information handling systems. For example, one option is to rotate the lid from the closed position for 360 degrees so that the display is exposed like a tablet and resting against the bottom surface of the main chassis portion. Another option is to rotate the lid 90 degrees about a horizontal axis to a conventional clamshell open position, then rotate the lid 180 degrees about a vertical axis so that the lid rotates to the closed position with the display facing outward. Other options include the use of a support frame with a display that flips around within the support frame to provide a tablet mode.

One difficulty with convertible information handling systems is that input devices designed for use in a clamshell configuration often interfere when the system converts to a tablet position or a tablet stand position. In particular, when a convertible system has a hinge with 360 degrees of rotation, the keyboard is exposed underneath the system if the lid fully rotates to a tablet position. Similarly, such convertible systems rest on the keyboard to hold the display in a tablet stand mode with approximately 270 degrees of lid rotation. If the keyboard, palm rest, mouse pad or other input devices rest on a support surface, the weight of the system or the force from end user inputs can result in inadvertent inputs at the system. Another difficulty is that both input and output devices at the system, such as the display, speakers and microphones, will have an inverted orientation relative to the clamshell configuration. Generally, keyboards of convertible information handling systems are automatically disabled when the system converts to a configuration not aligned to accept inputs, such as when a keyboard rests on a surface in the tablet mode or tablet stand mode. Generally, display devices automatically align an image presentation to an upright orientation based upon a sensed orientation, such as an orientation sensed by an accelerometer.

Another difficulty with convertible information handling systems is that, in the tablet and tablet stand modes, the keyboard, palm rest and touchpad surfaces rest on a support surface, however, the keyboard, palm rest and touchpad surfaces typically are made from hard plastic or metal materials that tend to have low friction coefficients. As a result, convertible information handling systems tend to slide when configured in a tablet mode and rested on a hard surface. This difficulty is magnified when systems have a reduced weight and size. Portable information handling systems typically include fixed or retractable footing devices to prevent slippage or sliding of the system when a bottom surface rests on a hard surface, however, footing devices, such as rubberized feet or cushions integrated proximate a keyboard are instrusive and/or obtrusive to the keyboard when the system is used in a clamshell configuration. Work-surface contacts, such as rubberized feet, that extend and retract add complexity to the system, increase the system size and increase the system cost.

SUMMARY OF THE INVENTION

Therefore a need has arisen for a system and method which supports a convertible information handling system in tablet and tablet stand configurations having input devices adapted to provide system footing.

In accordance with the present invention, a system and method are provided which substantially reduce the disadvantages and problems associated with previous methods and systems for supporting convertible information handling systems in tablet and tablet stand configurations on an input device. A friction enhanced material disposed at a keyboard region engages with a support surface when the keyboard rests on the support surface to resist sheer force applied by inputs made at a display of the information handling system. Using the friction enhanced material over the keyboard increases the surface area that resists sheer force from inputs so that lighter weight systems maintain their position on a support surface during use.

More specifically, a portable information handling system chassis portion couples with a lid portion through a hinge that rotates 360 degrees between a closed position, a tablet stand position and a tablet position. In the tablet stand and tablet positions, a keyboard disposed in the chassis portion contacts a support surface to support a display elevated distal the support surface. A friction enhanced material disposed over the keyboard, such as a rubberized plastic, resists sheer forces translated by user inputs to the display through the chassis to the support surface so that the portable information handling system tends to remain in position on the support surface during use. In one embodiment, the keyboard is a capacitive keyboard that accepts user inputs without any movement of the keys so that substantially the entire surface area of the keyboard generates friction-based resistance to sheer force. In an alternative embodiment, the friction coefficient of the friction-enhanced material is altered based upon the configuration of the information handling system so that increased friction characteristics are provided at the keyboard during use in the tablet and tablet-stand modes of operation. In another alternative embodiment, microphones disposed proximate the display are selectively used to beamform based upon the orientation of the display relative to an upright position or a visual image captured of an end user.

The present invention provides a number of important technical advantages. One example of an important technical advantage is that a convertible information handling system keyboard surface provides increased sheer force resistance in the tablet and tablet stand configurations so that end user inputs are less likely to induce system movement. By having the keyboard and related surfaces exposed to a support surface, increased surface area is provided to generate friction that resists sheer force movement. A high-coefficient friction material, such as a rubberized plastic, is used to manufacture the keys to further increase friction and reduce sheer force movement. Having a dual purpose keyboard that accepts user inputs and provides a support surface reduces or eliminates the need to extend tactile obstructions or other footing devices proximate the keyboard surface that interfere with end user inputs when the system is in the clamshell configuration. Increased friction provided by a keyboard supporting surface helps to keep even light weight convertible information handling systems immobile during use in the tablet and tablet stand configurations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4A-4C depict a front and side view of a portable information handling system having plural microphones disposed in selectable sets for beamforming with microphone set selected based upon a detected orientation of the portable information handling system;

DETAILED DESCRIPTION

A portable information handling system keyboard is coated with a friction enhanced material that resists movement of the portable information handling system when the system is configured to contact a support surface at the keyboard. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
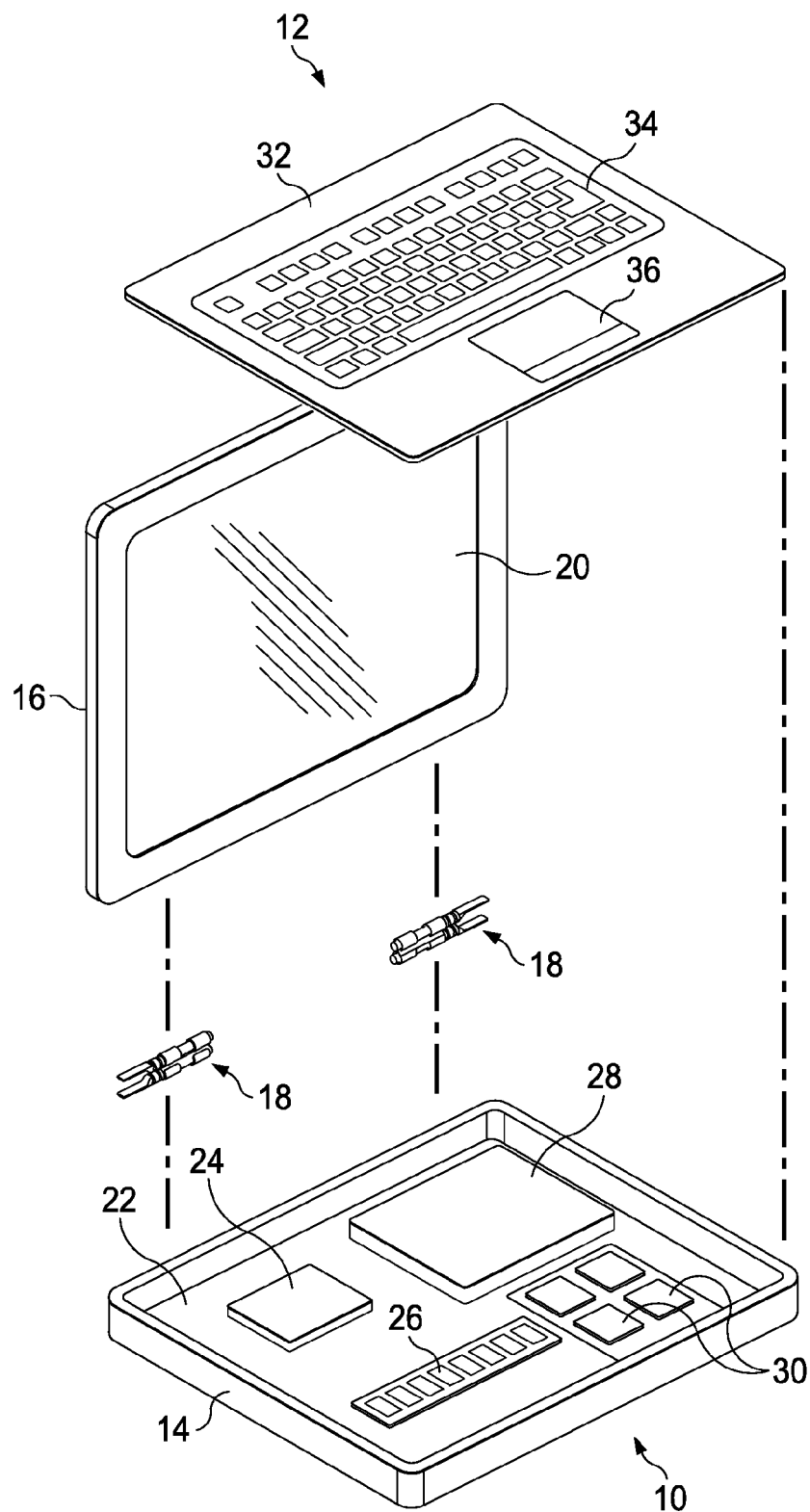
FIG. 1 depicts a blow-up view of a convertible information handling system having a keyboard region with friction-enhanced material.

Referring now to FIG. 1, a blow-up view depicts a convertible information handling system 10 having a keyboard region 12 with friction-enhanced material. Information handling system 10 has a chassis portion 14 rotationally couple to a lid portion 16 with hinge 18. In the example embodiment, hinge 18 provides 360 degrees of rotational movement for lid portion 16 relative to chassis portion 14, however, in alternative embodiments alternative types of movement may be used to convert keyboard region 12 into a support that holds a display 20 disposed in lid 16 in an elevated position. Chassis 14 holds processing components that cooperate to process information, such as for presentation of information as visual images at display 20. For instance, a motherboard 22 provides communication between a central processor unit (CPU) 24 that executes instructions and random access memory 26 (RAM) that stores the instructions. Persistent memory, such as a solid state drive (SSD) 28 or a hard disk drive, stores instructions and other information for retrieval by CPU 24. A chipset 30 includes processors, flash memory and firmware that coordinate the interaction between the processing components, such as a graphics subsystem that provides display 20 with pixel information for generating visual images from information processed by CPU 24.

Keyboard region 12 includes a chassis cover 32 that fits over chassis 14 and supports a keyboard 34 and touchpad 36. Keyboard 34 and touchpad 36 accept end user inputs and provide signals that represent the inputs to the processing components, such as through an embedded controller disposed in chipset 30. In the example embodiment, keyboard 34 is a substantially flat capacitive keyboard that accepts inputs without any moving keys. Keyboard region 12, including chassis cover 32, keyboard 34 and touchpad 36, have an outer surface with a friction-enhanced material that engages with an underlying support surface when convertible information handling system 10 converts to a tablet-type of configuration. For instance, an outer coating or a rubberized plastic is deposited over keyboard region 12, such as a mylar-type material. In one embodiment, the friction enhanced material has a friction coefficient for the material against itself of greater than one.

The friction enhanced material of keyboard region 12 improves the usability of portable information handling system 10 by increasing the resistance to movement in response to a sheer force introduced by inputs of an end user to display 20. For instance, when information handling system 10 rests on a working support surface normal to the force of gravity, the sheer threshold of the system—that is the applied force that induces sliding of the system across a work surface—is quantified by an external force greater than the system's mass times the coefficient of friction between the system and the work surface. By increasing the surface area of keyboard region 12 that interacts with the work surface at an enhanced coefficient of friction, the sheer force also increases to help maintain information handling system 10 in position. In addition, the increase surface area enhances system stability at lighter system weights. In various embodiments, various portions of a keyboard region are covered with the enhanced friction material and placed in contact plane to contact a work surface when in a tablet mode. The amount of sheer force needed to move a system is maximized by making the entire keyboard region 12 part of the contact plane. If a smaller sheer force is desired, portions of chassis cover 32, keyboard 34 or touchpad 36 may include moving keys or may otherwise be removed as a friction enhancing element from the contact plane. The use of keyboard 34 to increase resistance to sheer force with a friction enhanced material advantageously avoids the use of extensions or feet that protrude from keyboard region 12 in a manner that interferes with the use of the keyboard by an end user when the system is not in a tablet configuration.

Figure 2:
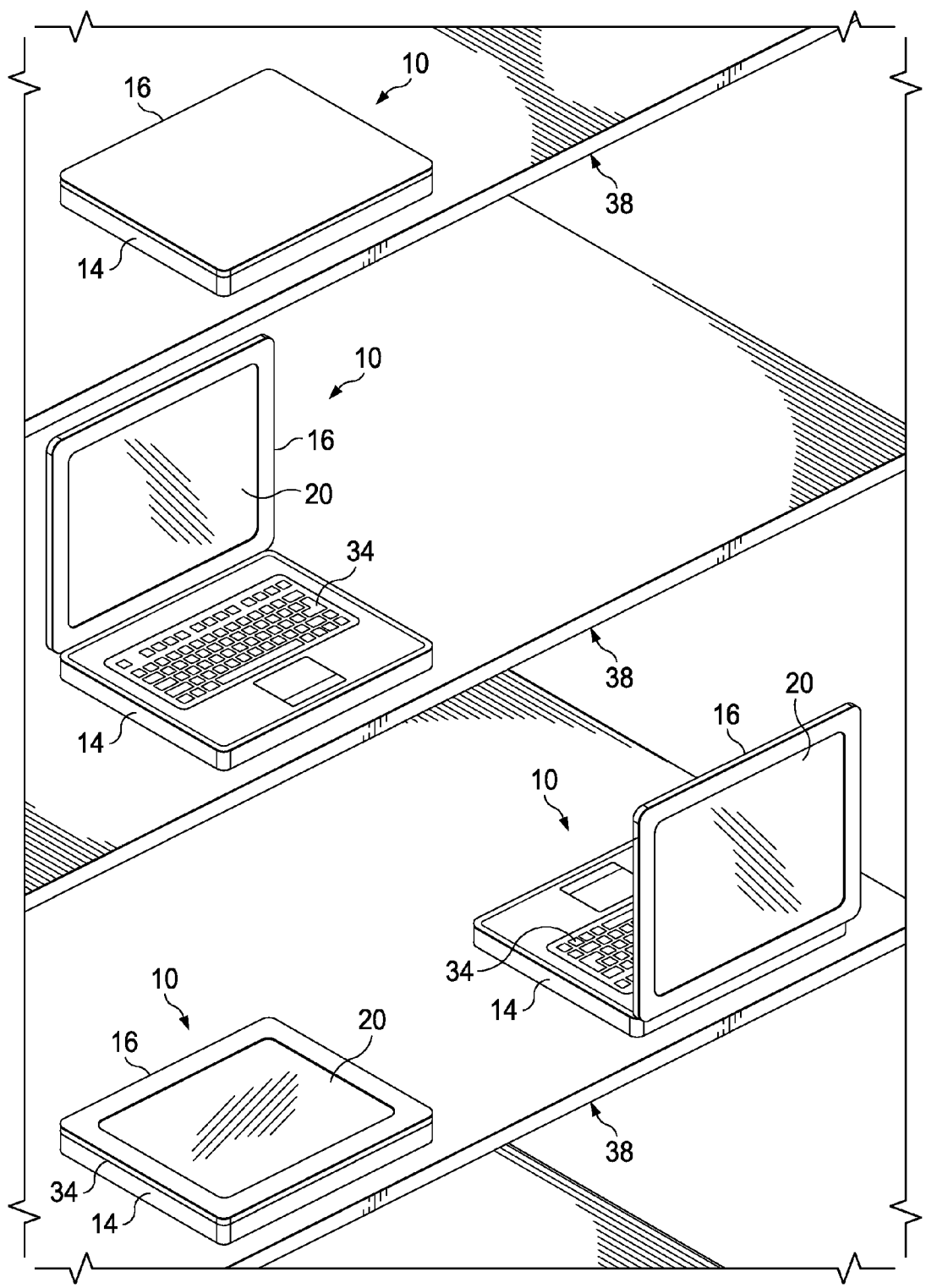
FIG. 2 depicts the convertible information handling system configured in closed, clamshell, tablet and tablet stand modes of operation.

Referring now to FIG. 2, a convertible information handling system 10 is depicted configured in closed, clamshell, tablet and tablet stand modes of operation. In the closed position, lid 16 closes over chassis 14 to bring display 20 proximate keyboard 34. The bottom of chassis 14 engages a work support surface 38 in a conventional manner, such as with feet that extend outward from chassis 14. In the clamshell configuration, lid 16 rotates substantially 90 degrees to expose display 20 and keyboard 34 for normal use. The clamshell configuration contacts works surface 38 in a conventional manner. In the tablet stand configuration, lid 16 rotates substantially 270 degrees to expose display 20 to an end user for touch inputs. In the tablet stand configuration, keyboard 34 rests on top of support surface 38 so that the display 20 is elevated above and substantially perpendicular to support surface 38. Keyboard 34 resists movement across support surface 38 in response to user inputs at display 20 that generate a sheer force. In the tablet configuration, lid 16 rotates substantially 360 degrees so that display 20 is exposed above support surface 38 and chassis 14 rests on keyboard 34 over support surface 38. In both the tablet stand and tablet configurations, friction-enhanced material disposed at the keyboard region 12 increases the resistance to movement across support surface 38 in response to forces introduced by end user inputs at display 20.

Figure 3:
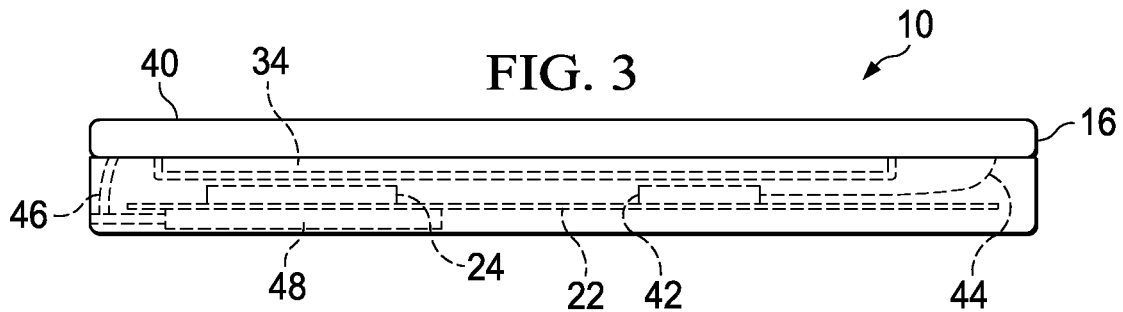
FIG. 3 depicts a side cutaway view of the convertible information handling system having adjustable friction-enhanced material to alter the friction coefficient at the keyboard region based on the system's mode of operation.

Referring now to FIG. 3, a side cutaway view depicts a convertible information handling system 10 having adjustable friction-enhanced material 40 to alter the friction coefficient at the keyboard region based on the system's mode of operation. In the example embodiment, a rubberized plastic coating 40 is applied to the keyboard region 12 upper outer surface of information handling system 10 to enhance the coefficient of friction for the outer surface. A power subsystem 42 interfaced with motherboard 22, such as in a chipset, provides power for running the processing components. Rubberized plastic coating 40 includes a variable coefficient of friction characteristic that allows selective increases and decreases to the friction provide by interaction of coating 40 with a support surface. When information handling system 10 is configured as a tablet or tablet stand, the friction characteristics of coating 40 are increased to increase resistance to movement provided by the keyboard region in response to a sheer force. When information handling system 10 is not configured to have keyboard region 12 interact with a support surface, the friction characteristics are selectively decreased to reduce undesirable interactions of coating 40 with an end user.

In one embodiment, heat is selectively increased or decreased at coating 40 to alter friction characteristics. For example, a heat extension 46 increases thermal energy at coating 40 when a weight detector determines that keyboard region 12 is in contact with a support surface and decreases thermal energy at coating 40 when keyboard region 12 does not contact a support surface. In the example embodiment, heat extension 46 adjusts thermal energy at coating 40 by selectively transferring heat from a heat pipe 48 that cools CPU 24. As another example, a power extension 44 selectively applies a charge to coating 40 to adjust the friction characteristics of coating 40, such as by altering its crystal form or other material characteristics. Some examples of such materials include a film deposited on top of silicone or polyurethane that includes hydrated sulfonated poly(styrene-ethylene/butylenes-styrene) triblock copolymer, as describe in Applied Surface Science, 252(23), pp. 8277-8286 or a polyurethane as describe in Diaconu, I., Dorohoi, D. O., and Topoliceanu, F., 2006, "Electrostriction of a polyurethane elastomer-based polyester," IEEE Sensors Journal, 6(4), pp. 876-880. Other examples of materials include those that automatically change friction characteristics response to force generated by the weight of the system against the material, or that automatically increase friction characteristics responsive to reduce light as describe in the article "Mechanically-induced Chemical Changes is Polymeric Materials" at http://braungroup.beckman.illinois.edu/nrs084.pdf.

Referring now to FIG. 4, a front and side view depicts a portable information handling system having plural microphones disposed in selectable sets for beamforming with microphone set selected based upon a detected orientation of the portable information handling system. A first set of side microphones 50 work together to beamform inbound audible sounds so that the direction of the source of sounds can be determined. A second set of top microphones 52 work together to beamform inbound audible sounds so that the direction of the source of sounds can be determined. A microphone beam 54 depicts how the directional beam tends to align with the axis of the selected set of microphones. Although all four microphones may be used to beamform a more exact sound source, the computations associated with multiple microphone use tends to consume excessive power, which can impact battery life of a portable system 10 when external power is not available. For more effective beamforming and reduced power consumption, information handling system 10 selects a set of microphones 50 or 52 rather than using all microphones to reduce power consumption when external power is not available. If external power is available, all microphones may be selectively used if an exact position of an audible source is needed. If less than all microphones are used, the set of microphones may be selected based upon the orientation of the system (portrait vs. landscape, etc. . . . ) or the image of an end user captured by a system camera, so that beam 54 aligns with the location or likely location of an audible source.

Figure 5:
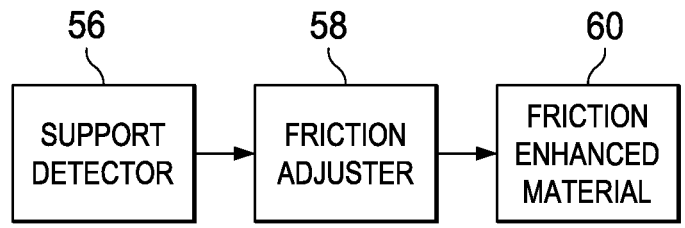
FIG. 5 depicts a functional block diagram of a system for adjusting friction of a portable information handling system based upon the surface selected for supporting the portable information handling system.

Referring now to FIG. 5, a functional block diagram depicts a system for adjusting friction of a portable information handling system based upon the surface selected for supporting the portable information handling system. A support detector 56 detects when an information handling system is using or is configured to use a keyboard region for resting on a support surface. For example, a tablet or tablet stand configuration is detected based upon the amount of rotation about a hinge, the weight of the system pressing against the keyboard region, the lack of light present at an ambient sensor disposed in the keyboard region, an acceleration or gyroscopic sensed condition, or other inputs. A friction adjuster 58 increases the friction characteristics of a keyboard region if the keyboard region is used for support and decreases the friction characteristics if the keyboard region is not used support. The friction enhanced material 60 applies the setting of the friction adjuster to adjust its friction characteristics.

Figure 6:
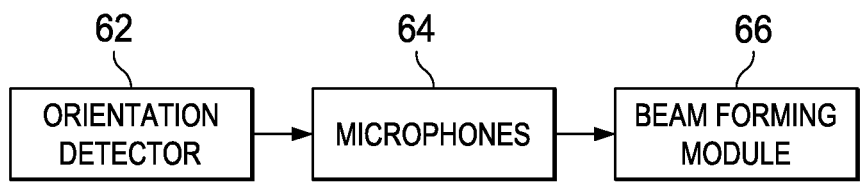
FIG. 6 depicts a functional block diagram of a system for adjusting microphone selection for beamforming based on a detected portable information handling system orientation.

Referring now to FIG. 6, a functional block diagram depicts a system for adjusting microphone selection for beamforming based on a detected portable information handling system orientation. The orientation detector 62 determines an orientation of the information handling system, such as based upon an acceleration or image of an end user. The orientation detector 62 provides the orientation to microphones 64 to selectively turn on microphones for use with beamforming and selectively turn off microphones not used for beamforming. Alternatively, inputs from microphones are selectively enabled or disabled as needed for beamforming. Beamforming module 66 accepts the inputs from identified microphones and uses the selected inputs to beamform.

Although the present invention has been described in detail, it should be understood that various changes, substitutions and alterations can be made hereto without departing from the spirit and scope of the invention as defined by the appended claims.

What is claimed is:

1. An information handling system comprising:
a chassis having an upper surface and a bottom surface;
a lid;
one or more hinges rotationally coupling the chassis and the lid;
processing components disposed in the chassis to process information;
a display disposed in the lid and interfaced with the processing components, the display presenting the information as visual images;
a keyboard disposed in the chassis to accept end user inputs, the keyboard having a friction-enhanced material;
wherein chassis and lid rotate between a first position having the lid proximate the upper surface and a second position having the lid proximate the bottom surface, the keyboard exposed to a support surface in the second position so that the friction-enhanced material resists a sheer force translated through the chassis to the support surface; and
wherein the keyboard comprises a capacitive keyboard having only keys that do not move;
plural microphones interfaced with the processing components and operable to capture audible sounds for use by the processing components;
an orientation device interfaced with the processing components and operable to determine an orientation of the microphones; and
a beamforming module stored in a non-transitory memory and operable to execute on the processing components to beamform sounds detected at selected of the plural microphones, the microphones selected based upon the orientation.

2. The information handling system of claim 1 wherein the plural microphones are disposed in the lid to have a first set of microphones aligned along a first axis and a second set of microphones aligned along a second axis substantially perpendicular to the first set of microphones, the beamforming module selecting the first set of microphones for a first orientation and the second set of microphones for a second orientation.

3. The information handling system of claim 1 wherein the beamforming module selects a set of less than all of the microphones so that the selected set of microphones has an axis most closely aligned to parallel with the support surface relative to other defined sets of microphones.

* * * * *